(12) United States Patent
Kameshima et al.

(10) Patent No.: US 7,708,414 B2
(45) Date of Patent: May 4, 2010

(54) ANTIGLARE FILM

(75) Inventors: Hisamitsu Kameshima, Tokyo (JP); Tomoya Oohira, Tokyo (JP); Tomo Yoshinari, Tokyo (JP); Kae Takahashi, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 385 days.

(21) Appl. No.: 11/864,458

(22) Filed: Sep. 28, 2007

(65) Prior Publication Data

US 2008/0212190 A1    Sep. 4, 2008

(30) Foreign Application Priority Data

Mar. 2, 2007    (JP) .............................. 2007-052514

(51) Int. Cl.
*G02F 1/1335* (2006.01)
(52) U.S. Cl. ...................................... 359/601; 349/137
(58) Field of Classification Search ................ 359/601, 359/613; 349/137
See application file for complete search history.

(56) References Cited

U.S. PATENT DOCUMENTS

| 5,903,391 | A * | 5/1999 | Toshima et al. ............. 359/599 |
| 6,164,785 | A * | 12/2000 | Maekawa .................... 359/613 |
| 6,696,140 | B2 * | 2/2004 | Suzuki ........................ 428/212 |
| 6,710,923 | B2 * | 3/2004 | Ito ............................... 359/599 |
| 6,852,376 | B2 * | 2/2005 | Chien et al. .................. 428/1.3 |
| 7,525,731 | B2 * | 4/2009 | Aro et al. ..................... 359/599 |
| 7,542,118 | B2 * | 6/2009 | Miyauchi et al. ............ 349/137 |
| 2007/0253064 | A1 * | 11/2007 | Ookubo et al. .............. 359/599 |
| 2009/0268299 | A1 * | 10/2009 | Furui et al. .................. 359/601 |

FOREIGN PATENT DOCUMENTS

| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2002107512 A * | 4/2002 |
| JP | 2002169007 A * | 6/2002 |
| JP | 2003-004903 | 1/2003 |
| JP | 2003-149413 | 5/2003 |
| JP | 2003-260748 | 9/2003 |
| JP | 2004-004777 | 1/2004 |
| JP | 2004-082613 | 3/2004 |
| JP | 2004-125958 | 4/2004 |

\* cited by examiner

*Primary Examiner*—Alessandro Amari
*Assistant Examiner*—Mark Consilvio
(74) *Attorney, Agent, or Firm*—Squire, Sanders & Dempsey, L.L.P.

(57) ABSTRACT

An antiglare film is disclosed including a transparent substrate; and an antiglare layer including a binder matrix and a particle, wherein reflectivity of 5° angle of a surface of the antiglare film which surface is in the antiglare layer side among both sides of the antiglare film is 2.4-4.4%, wherein image clarity ($C_{(0.5)}+C_{(1.0)}+C_{(2.0)}$) measured by reflection method on an antiglare layer side is 20-70%, and wherein difference in refractive index between the binder matrix and the particle is equal to or less than 0.07.

8 Claims, 4 Drawing Sheets

(a)

(b)

ANTIGLARE FILM

CROSS REFERENCE

This application claims priority to Japanese application number 2007-052514, filed on Mar. 2, 2007, which is incorporated by reference.

BACKGROUND OF THE INVENTION

1. Field of the Invention

The present invention relates to an antiglare film to be provided on the surface of a window, display etc. In particular, it relates to an antiglare film to be provided on the front surface of such displays as a liquid crystal display (LCD), cathode-ray tube (CRT) display, plasma display (PDP), organic electroluminescence display (ELD) and field effect display (FED, SED). Further, it relates to an antiglare file to be provided on the front surface of a display of a laptop PC or desktop personal computer.

2. Description of the Related Art

Displays such as a liquid crystal display, CRT display, EL display and plasma display have some problems described below from the viewpoint of visibility.

External light reflects at looking and listening.

Surface glare (scintillation) occurs at the display surface by display light from the display.

Visibility is not good caused by dazzle of display light directly coming from the display without being diffused, etc.

Visibility is also degraded by such defect as unevenness of brightness.

In order to solve such lowering or degradation of visibility, it is known to arrange an antiglare film on the front face of a display.

As an antiglare film, for example, following techniques are known:

To arrange, on the surface of a display, an antiglare film having an antiglare layer having been subjected to embossing finish.

To arrange, on the surface of a display, an antiglare film having an antiglare layer on the surface of which is formed irregularity by mixing particles in a binder matrix.

In such antiglare film, scattering phenomenon (surface diffusion) of light caused by surface irregularity is utilized.

Further, such antiglare film is also known that, by mixing particles having a refraction index different from that of a binder matrix into the binder matrix, utilizes internal scattering (internal diffusion) of light based on the difference in refraction indices of the binder matrix and particles.

In an antiglare film on the surface of which is formed irregularity through embossing finish, the surface irregularity thereof can be completely controlled. Consequently, reproducibility is good. However, when there is a defect or an adhered foreign substance on an emboss roll, endless defects occurs at the pitch of roll.

On the other hand, an antiglare film using a binder matrix and particles can be manufactured through a smaller number of processes than the antiglare film using embossing finish. Accordingly, it can be manufactured inexpensively. Therefore, various embodiments of antiglare film are known (Patent Document 1).

As for an antiglare film using a binder matrix and a particle, various technologies are disclosed, for example, the following technology is disclosed:

A technique in which binder matrix resin, spherical particles and amorphous particles are used in combination (Patent Document 2).

A technique in which binder matrix resin and plural particles having different particle sizes are used (Patent Document 3).

A technique including surface irregularity, wherein the cross-sectional area of the concave portion is defined (Patent Document 4).

In addition, the following techniques are disclosed:

A technique wherein internal haze (cloudiness) is 1-15% and surface haze (cloudiness) is 7-30% by using internal scattering and surface scattering in combination. (Patent Document 5)

A technique wherein, while using binder resin and particles having the particle size of 0.5-5 µm, the difference in refraction indices of the resin and the particle is 0.02-0.2 (Patent Document 6).

A technique wherein, while using binder resin and particles having the particle size of 1-5 µm, the difference in refraction indices of the resin and the particle is 0.05-0.15. Further, techniques defining a solvent to be used, surface roughness etc. (Patent Document 7).

A technique wherein, using binder resin and plural types of particles, the difference in refraction indices of the resin and the particle is 0.03-0.2 (Patent Document 8).

There are also known following techniques that reduce lowering of contrast, hue variation etc. when a viewing angle is altered. In the technique, the surface haze (cloudiness) is 3 or more. Further, the difference between the haze value in the direction of normal line and the haze value in the direction of±60° is 4 or less (Patent Document 9).

As described above, there are disclosed antiglare films of various constitutions for various purposes.

The performance required for an antiglare film differs depending on displays when it is used on the front face of a display. For example, the optimum antiglare film differs depending on the resolving power of a display, intended purpose etc. A broad range of antiglare films are required according to intended purposes.

An antiglare film prevents external light from reflecting by scattering light incident on an antiglare layer. Therefore, in a case where external light reflection preventive property is increased, an antiglare film tends to be whitened. In these years, an antiglare film without white blur, that is, with less white blur tends to be desired according to the change of consumer's tastes. However, as mentioned above, as for an antiglare film, the external light reflection preventive properties and the whitening degree were in a trade-off relation. In a case where enough antiglare property was achieved, an antiglare film tended to be whitened. Conversely, in a case where the whitening was controlled, the external light reflection preventive properties were not achieved sufficiently. The purpose of the present invention is to provide an antiglare film which is superior in external light reflection preventive properties without the whitening.

[Patent Document 1] JP-A-6-18706
[Patent Document 2] JP-A-2003-260748
[Patent Document 3] JP-A-2004-004777
[Patent Document 4] JP-A-2003-004903
[Patent Document 5] JP-A-11-305010
[Patent Document 6] JP-A-11-326608
[Patent Document 7] JP-A-2000-338310
[Patent Document 8] JP-A-2000-180611
[Patent Document 9] JP-A-11-160505

SUMMARY OF THE INVENTION

In one embodiment of the present invention an antiglare film is disclosed comprising: a transparent substrate; and an antiglare layer including a binder matrix and a particle, wherein reflectivity of 5° angle of a surface of the antiglare film which surface is in the antiglare layer side among both sides of the antiglare film is 2.4-4.4%, wherein image clarity ($C_{(0.5)}+C_{(1.0)}+C_{(2.0)}$) by reflection method on an antiglare layer side is 20-70%, and wherein difference in refractive index between the binder matrix and the particle is equal to or less than 0.07.

In these drawings, 1 is an antiglare film; 11 is a transparent substrate; 12 is a antiglare layer; 120 is a binder matrix; 121 is a particle; H is average film thickness of an antiglare layer; L1 is incident light; L2 is reflected light; 2 is a polarizing plate; 21 is a transparent substrate; 22 is a transparent substrate; 23 is a polarizing layer; 3 is a liquid crystal cell; 4 is a polarizing plate; 41 is a transparent substrate; 42 is a transparent substrate; 43 is a polarizing plate; 5 is a backlight unit; 7 is a polarizing plate unit; 30 is a die head; 31 is a piping; 32 is a tank for a coating liquid; 33 is a liquid supplying pump; and 35 is a rotary roll.

DESCRIPTION OF THE PREFERRED EMBODIMENTS

An antiglare film of an embodiment of the present invention is described below.

Figure 1:
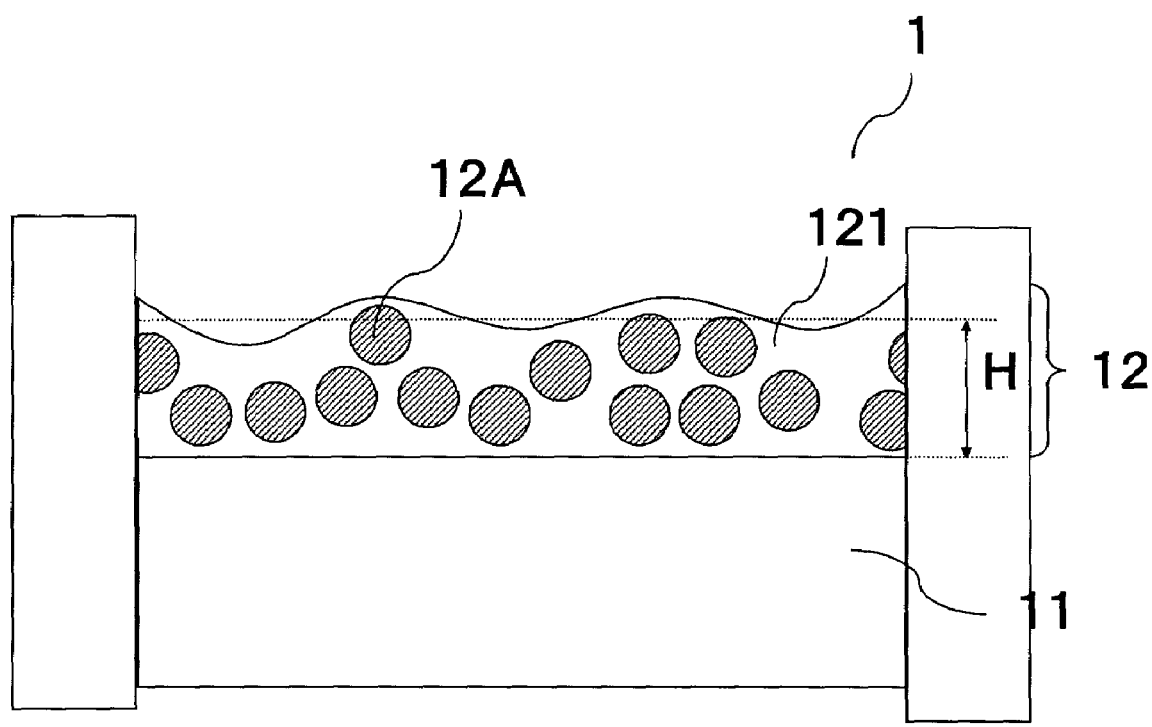
FIG. 1 is a cross section view of an antiglare film of an embodiment of the present invention.

FIG. 1 shows a cross sectional view of an antiglare film of an embodiment of the present invention. As for antiglare film (1), antiglare layer (12) is formed on transparent substrate (11). Antiglare layer (12) of antiglare film (1) includes binder matrix (120) and particle (121).

In embodiments of the present invention, reflectivity of 5° angle of a surface of the antiglare film which surface is in the antiglare layer side among both sides of the antiglare film is 2.4-4.4%, image clarity ($C_{(0.5)}+C_{(1.0)}+C_{(2.0)}$) of the surface by reflection method is 20-70%, and difference in refractive index between the binder matrix and the particle is equal to or less than 0.07.

In the present invention, reflectivity of 5° angle of the surface is 2.4-4.4%. In a case where reflectivity of 5° angle of the surface is less than 2.4%, a whitened antiglare film is obtained. On the other hand, in a case where reflectivity of 5° angle of the surface is more than 4.4%, an antiglare film having enough antiglare property can not be obtained.

Figure 2:
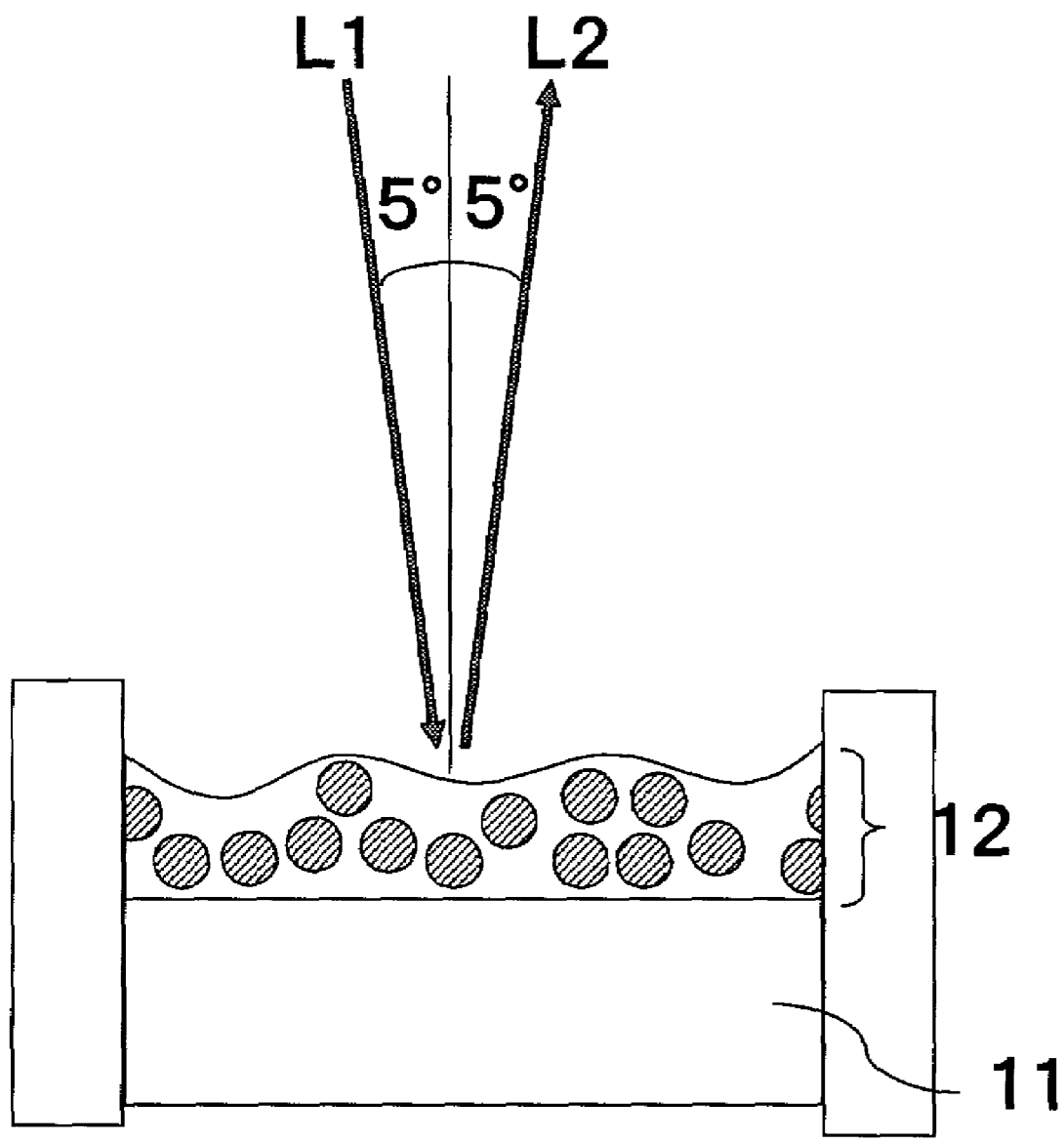
FIG. 2 is a drawing illustrating measurement of reflectance.

In addition, reflectivity of 5° angle means reflectivity in the direction at 5° angle from the normal line to a surface of an antiglare layer and can be measured by using a reflectivity measuring apparatus. FIG. 2 illustrates the measurement of the reflectivity of 5° angle. Incident light L1 from a direction at 5° angle from the normal line to a surface of an antiglare layer is incident on an antiglare layer. Intensity of reflected light L2 which is light reflected on an antiglare layer is measured in another direction at 5° angle from the normal line to a surface of an antiglare layer, wherein the direction of L1 is opposite to the another direction of L2. At this case, relative value of intensity of reflected light L2 is referred to as "reflectivity of 5° angle", wherein intensity of incident light L1 is defined as 100%.

As for an antiglare film of the present invention, image clarity ($C_{(0.5)}+C_{(1.0)}+C_{(2.0)}$) by reflection method on an antiglare layer side is 20-70%. In a case where image clarity ($C_{(0.5)}+C_{(1.0)}+C_{(2.0)}$) by reflection method on an antiglare layer side is more than 70%, the obtained antiglare film can not have enough antiglare property. On the other hand, in a case where image clarity ($C_{(0.5)}+C_{(1.0)}+C_{(2.0)}$) by reflection method on an antiglare layer side is less than 20%, a displayed image is blurred in a case where the obtained antiglare film is placed on a front surface of a display.

Image clarity ($C_{(0.5)}+C_{(1.0)}+C_{(2.0)}$) by reflection method on an antiglare layer side of an antiglare film of the present invention can be determined according to JIS K7105-1981. In the present invention, image clarity ($C_{(0.5)}+C_{(1.0)}+C_{(2.0)}$) by reflection method is sum of image clarity ($C_{(0.5)}$) by reflection method using a optical comb having width of 0.5 mm, image clarity ($C_{(1.0)}$) by reflection method using a optical comb having width of 1.0 mm and image clarity ($C_{(2.0)}$) by reflection method using a optical comb having width of 2.0 mm. Most commonly, image clarity of an antiglare film as a sample can be determined by transmission method. However, in the present invention, image clarity is measured by reflection method.

In some embodiments of the present invention, difference in refractive index between the binder matrix and the particle included in the antiglare layer is equal to or less than 0.07. In a case where difference in refractive index between the binder matrix and the particle is more than 0.07, internal scattering of light incident on inside of an antiglare layer is increased, and an antiglare film is whitened.

In addition, in some embodiments of the present invention, in a case where plural kinds of particles are used, difference in refractive index between a binder matrix and one kind of particle of which content is most among the plural kinds of particles is equal to or less than 0.07.

In addition, in some embodiments of the present invention, refractive index of a binder matrix means refractive index of a binder matrix comprising a binder matrix forming material without a particle. That is, refractive index of a binder matrix is refractive index of a cured binder matrix forming material. The refractive indexes of a binder matrix and a particle can be measured according to the Becke line-detecting method (immersion method).

In the present invention, the setting of three parameters, that is, "reflectivity of 5° angle of a surface of the antiglare film which surface is in the antiglare layer side among both sides of the antiglare film", "image clarity ($C_{(0.5)}+C_{(1.0)}+C_{(2.0)}$) by reflection method on an antiglare layer side" and "difference in refractive index between the binder matrix and the particle" at desired ranges allows an antiglare film to have enough external light reflection preventive property without whit blur. In a case where one or more parameters among the three parameters is out of the desired ranges, an antiglare film having enough external light reflection preventive property without whit blur can not be obtained.

An antiglare film of the present invention have a function of scattering external light incident on a surface of an antiglare film and a function of distorting external light incident on a surface of an antiglare film. The function of scattering external light incident on a surface of an antiglare film is shown by reflectivity of 5° angle and the function of distorting external light incident on a surface of an antiglare film is shown by image clarity measured by reflection method.

The lower the reflectivity of 5° angle showing the level of scattering external light incident on a surface of an antiglare film, the better the reflection of light incident on a surface of an antiglare film can be preferably controlled. However, if the reflectivity of 5° angle is too low, an antiglare film tends to be whitened. In the present invention, while the reflectivity of 5° angle is controlled as low as possible within the range where whitening is not occurred, image clarity ($C_{(0.5)}+C_{(1.0)}+C_{(2.0)}$) measured by reflection method showing the level of distorting external light incident on a surface of an antiglare film is controlled to be within a desired range, thereby an antiglare film can distort an image formed by external light when external incident light is reflected at an antiglare film. Further, in the present invention, enough antiglare property can be achieved by scattering external light incident on a surface of an antiglare layer and distorting an image formed by external light incident on an antiglare film. That is, in the present invention, reflecting of external light incident on an antiglare film can be effectively prevented within the range where an antiglare film is not whitened, by setting "reflectivity of 5° angle" and "image clarity ($C_{(0.5)}+C_{(1.0)}+C_{(2.0)}$) measured by reflection method" at desired ranges and by making an antiglare film have a function of scattering external light incident on a surface of an antiglare film and a function of distorting external light incident on a surface of an antiglare film.

Further, in some embodiments of the present invention, since an antiglare film is whitened if difference in refractive index between a binder matrix and a particle included in an antiglare layer is more than 0.07, the difference in refractive index should be equal to or less than 0.07.

Further, in some embodiments of the present invention, it is desirable that average film thickness H of an antiglare film is 1.4 times or more than average particle diameter of a particle included in an antiglare layer and is 3.8 times or less than the average particle diameter. In the present invention, since average particle diameter of a particle included in an antiglare layer is used as standard, "reflectivity of 5° angle of a surface in an antiglare layer side" and "image clarity ($C_{(0.5)}+C_{(1.0)}+C_{(2.0)}$) measured by reflection method on an antiglare layer side" are easily set at desired ranges.

In a case where average film thickness H of an antiglare layer is 1.4 times or less than average particle diameter of a particle included in an antiglare layer, a lot of particles should be included in an antiglare layer in order to form desired concaves and convex in a surface of an antiglare layer, therefore the stability of a coating liquid including a binder matrix forming material, a particle and a solvent to form an antiglare layer may be lowered. On the other hand, in a case where average film thickness H of an antiglare layer is 3.8 times or more than average particle diameter of a particle included in an antiglare layer, an amount of particles in an antiglare layer to form desired concaves and convexes in a surface is small, therefore it may be difficult to form a dispersed coating liquid.

In addition, in a case where plural kinds of particles are used in the present invention, one kind of particle of which content is most among the plural kinds of particles should be considered as a base. That is, average film thickness H of an antiglare layer is 1.4 times or more than average particle diameter of one kind of particle of which content is most among the plural kinds of particles and average film thickness H of an antiglare layer is 3.8 times or less than average particle diameter of one kind of particle of which content is most among the plural kinds of particles.

In addition, an average film thickness of an antiglare layer can mean an average value of a film thickness of an antiglare layer having surface irregularity. An average film thickness H can be measured by using an electronic micrometer or a full automatic detailed configuration measurement machine. In addition, average particle diameter of a particle can be measured by a method for measuring particle diameter distribution based on light scattering.

In addition, it is desirable that average film thickness of an antiglare layer is 3-30 μm. In a case where average film thickness of an antiglare layer is less than 3 μm, an antiglare film may not be obtained, wherein the antiglare film is hard enough to be arranged on a front surface of a display. On the other hand, in a case where average film thickness is more than 30 μm, manufacturing cost is too high, and the antiglare film may not be suitable for the process where the antiglare film is arranged on a front surface of a display since the degree of curl of the antiglare film is too large. Further, more preferably, average film thickness of an antiglare layer is 4-20 μm.

In addition, it is desirable that difference in refractive index between a binder matrix and a particle in an antiglare layer is equal to or more than 0.02. In a case where difference in refractive index between a binder matrix and a particle is equal to or more than 0.02, dazzling of an antiglare film can be controlled, which dazzling is easily occurred if an antiglare film is placed on a front surface of a high-definition display. That is, it is desirable that difference in refractive index between a binder matrix and a particle in an antiglare layer is 0.02-0.07. Further, as mentioned above, in a case where plural kinds of particle is used, it is desirable that difference in refractive index between a binder matrix and one kind of particle is equal to or more than 0.02, wherein the content of the one kind of particle is most among the plural kinds of particles.

Further, it is desirable that a triacetylcellulose film is used as a transparent substrate. A triacetylcellulose film is preferable since double refraction in a triacetylcellulose film is small and transparency of a triacetylcellulose film is high. Especially, in a case where an antiglare film of the present invention is used for a front surface of a liquid crystal display, it is desirable that a triacetylcellulose film is used as a transparent substrate.

Further, it is desirable that an antiglare layer is manufactured by a step of forming a coated film by applying a coating liquid including a binder matrix forming material, a particle and a solvent, wherein the binder matrix forming material can be cured by irradiation of ionizing radiation, to a transparent substrate comprising a triacetylcellulose film and a step of irradiating the coated film on the transparent substrate with ionizing radiation, wherein the solvent is a mixed solvent including one kind of solvent and another kind of solvent, and wherein the one kind of solvent dissolves or swells the transparent substrate and the another kind of solvent does not dissolve or swell the transparent substrate.

It is desirable that an antiglare film of the present invention is manufactured by a step of forming a coated film by applying a coating liquid including a binder matrix forming material, a particle and a solvent, wherein the binder matrix forming material can be cured by irradiation of ionizing radiation, to a transparent substrate and a step of irradiating the coated film on the transparent substrate with ionizing radiation. At the steps, if a triacetylcellulose film is used as a transparent substrate, adhering strength between a transparent substrate and an antiglare layer formed on the transparent subsutrate may be lowered. In the present invention, an antiglare film having enough adhering strength between a triacetylcellulose film and an antiglare layer can be obtained by using a mixed solvent for a coating liquid, which mixed solvent includes one kind of solvent and another kind of solvent, wherein the one kind of solvent dissolves or swells the transparent substrate and the another kind of solvent does not dissolve or swell the transparent substrate.

In a case where a solvent of a coating liquid includes only one kind of solvent and the one kind solvent does not dissolve or swell the transparent substrate, an antiglare film having enough adhering strength may not be manufactured. On the other hand, In a case where a solvent of a coating liquid includes only another one kind of solvent and the another one kind of solvent dissolves or swells the transparent substrate, the another one kind of solvent dissolves or swells the transparent substrate too much and causes defective stripes or the like.

In addition, as for a mixed solvent used for the present invention, it is desirable that the ratio of "one kind solvent which does not dissolve or swell a triacetylcellulose film" to "another one kind of solvent which dissolves or swells the transparent substrate" is (1:9)-(9:1). More preferably, the ratio is (2:8)-(8:2).

In addition, in the present invention, it is desirable that a binder matrix forming material includes "trifunctional acrylic monomer and tetrafunctional acrylic monomer" of 80 part by weight or more based on a binder matrix forming material of 100 part by weight, wherein the binder matrix forming material can be cured by irradiation of ionizing radiation. The using of the binder matrix which the binder matrix forming material including "trifunctional acrylic monomer and tetrafunctional acrylic monomer" of 80 part by weight or more based on a binder matrix forming material of 100 part by weight is cured by irradiation of ionizing radiation produces an antiglare film having sufficient abrasion resistant property with an enough hard antiglare layer.

In a case where a monofunctional acrylate monomer or a bifunctional acrylate monomer used instead of either of trifunctional acrylic monomer and tetrafunctional acrylic monomer, an antiglare layer to be formed can not have enough hardness. Further, in a case where a binder matrix curable material includes "trifunctional acrylic monomer and tetrafunctional acrylic monomer" of less than 80 part by weight based on a binder matrix forming material of 100 part by weight, it may be difficult for an antiglare layer to be formed to have enough hardness.

In addition, in a case where only trifunctional acrylic monomer is used and tetrafunctional acrylic monomer is not used, defects such as streak and unevenness at a front surface of an antiglare layer to be formed can occur easily and non-uniformity inside a front surface of an antiglare layer occurs. In addition, in a case where only tetrafunctional acrylic monomer is used and trifunctional acrylic monomer is not used, defects such as streak and unevenness at a front surface of an antiglare layer to be formed is easy to occur, non-uniformity inside a front surface of an antiglare layer occurs and curl of an antiglare film to be manufactured can occur easily.

In addition, in the present invention, the mixing ratio of trifunctional acrylic monomer and tetrafunctional acrylic monomer can be selected from (1:10)-(10:1). Further, in the light of balancing high abrasion resistant property with controlling curl, more preferably, the mixing ratio of trifunctional acrylic monomer and tetrafunctional acrylic monomer can be (1:3)-(3:1).

In addition, an antiglare film can have a functional layer having a performance such as reflection preventing performance, antistatic performance, antifouling performance, electromagnetic shield performance, infrared absorbing performance, ultraviolet absorbing performance and color correcting performance. Examples of these functional layers include a reflection preventing layer, an antistatic layer, an antifouling layer, an electromagnetic shield layer, an infrared absorbing layer, an ultraviolet absorbing layer, a color correcting layer and the like. In addition, these functional layers may consist of one layer or a plural of layers. One embodiment of the functional layer consisting of one layer having a plurality of functions. For example, a reflection preventing layer having antifouling performance can be adopted. In addition, to improve adhesion property between a transparent substrate and an antiglare layer or between some kinds of layers, a primer layer, an adhesion layer and the like can be provided between some layers.

An antiglare film of the present invention can be used for a surface at a observer side of various displays such as a liquid crystal display (LCD), a CRT display, an organic electroluminescence display (ELD), a plasma display (PDP), surface-conduction electron-emitter display (SED), or a Field Emission Display (FED). An antiglare film of the present invention can have both external light reflection preventive property and good contrast when an antiglare film is used for a display.

Figure 3:
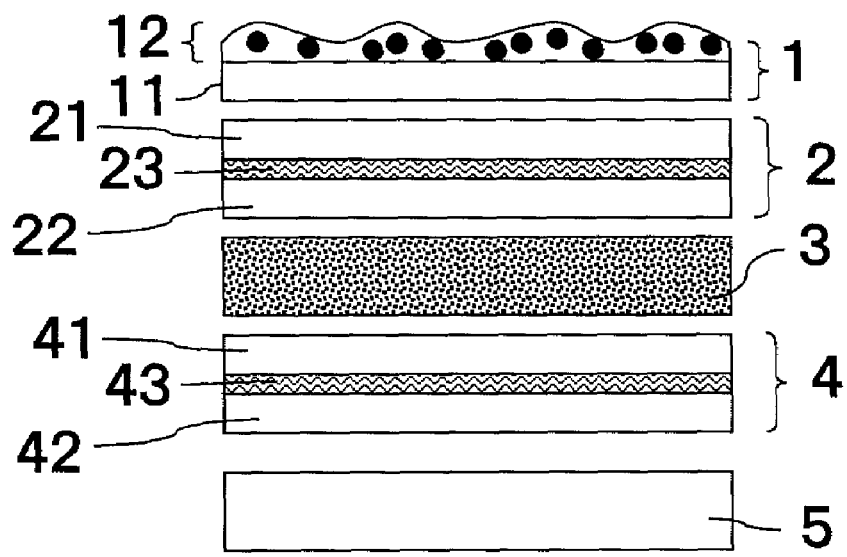
FIG. 3 is a cross section view of a transmission type liquid crystal display using an antiglare film of an embodiment of the present invention.
Figure 3:
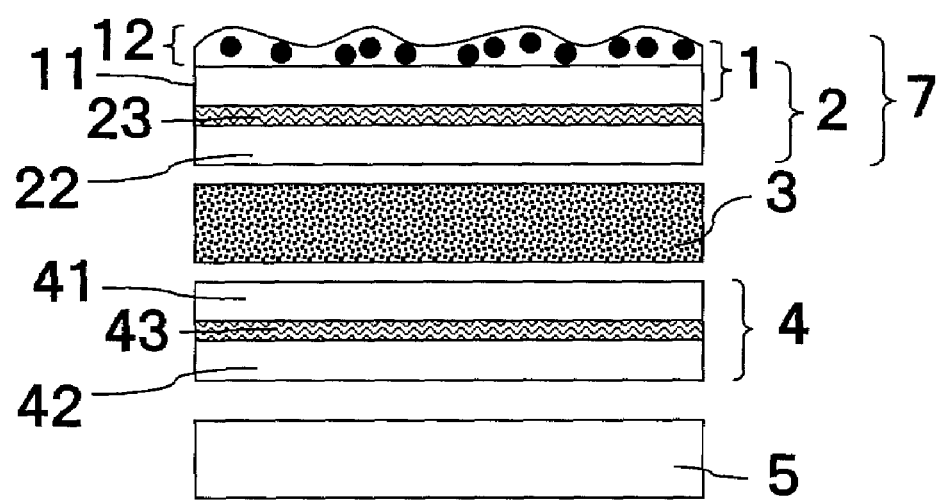

FIG. 3 is a cross-sectional view showing a transmission type liquid crystal display with the use of an antiglare film of the present invention. A transmission type liquid crystal display shown in FIG. 3(a) has a backlight unit (5), a polarization plate (4), a liquid crystal cell (3), a polarization plate (2) and an antiglare film (1) in this order. In this embodiment, an antiglare film (1) side is an observer side, that is, a front surface of a display.

A backlight unit (5) comprises a light source and a light diffusing plate. As for a liquid crystal cell, an electrode is provided on a transparent substrate in one side, an electrode and a color filter are provided on a transparent substrate in another side and a liquid crystal is encapsulated between both of the electrodes. As for polarization plates sandwiching a liquid crystal cell (3), polarization layers (23, 43) are between transparent substrates (21, 22, 41 and 42).

Next, a method of manufacturing an antiglare film of the present invention is described below.

In a method of manufacturing an antiglare film of the present invention, an antiglare layer can be formed on a transparent substrate by a step of forming a coated film on a transparent substrate by applying a coating liquid including a binder matrix forming material which can be cured by irradiation of ionizing radiation and a particle and a step of curing a binder matrix forming material by irradiation of ionizing radiation.

As the substrate for use in the antiglare film of the invention, glass, a plastic film etc. can be used. It suffices that the plastic film has a proper degree of transparency and mechanical strength. For example, such films as polyethylene terephthalate (PET), triacetylcellulose (TAC), diacetylcellulose, acetylcellulose butyrate, polyethylene naphthalate (PEN), cycloolefine polymer, polyimide, polyether sulfone (PES), polymethyl methacrylate (PMMA) and polycarbonate (PC) can be used. Among them, a triacetylcellulose film is preferably used since double refraction in a triacetylcellulose film is small and transparency of a triacetylcellulose film is high. Especially, in a case where an antiglare film of the present invention is used for a front surface of a liquid crystal display, it is desirable that a triacetylcellulose film is used as a transparent substrate.

Further, a polarizing plate may be used as the substrate. There is no particular limitation on a polarizing plate to be used. For example, such polarizing plate can be used that has a stretched polyvinyl alcohol (PVA) added with iodine as a polarizing layer between a pair of triacetylcellulose (TAC) films which are supporting bodies of a polarizing layer. A polarizing plate composed of a TAC film and a stretched PVA added with iodine has a high polarization degree and can be used suitably for a liquid crystal display etc. In this case, an antiglare layer can be provided on one of triacetylcellulose (TAC) films.

A coating liquid includes a binder matrix forming material which is cured with ionizing radiation and a particle.

Examples of the ionizing radiation-curable resin include polyfunctional acrylate resin such as acrylic or methacrylic ester of polyhydric alcohol, and polyfunctional urethane acrylate resin synthesized from diisocyanate, polyhydric alcohol and hydroxyl ester of acrylic acid or methacrylic acid. In addition to these, polyether resin having an acrylate-based functional group, polyester resin, epoxy resin, alkyd resin, spiroacetal resin, polybutadiene resin, polythiolpolyene resin can be also used as the ionizing radiation-curable resins.

It is desirable that, among them, trifunctional acrylic monomer and tetrafunctional acrylic monomer which are ionizing radiation-curable materials are used as a binder matrix forming material. The usage of trifunctional acrylic monomer and tetrafunctional acrylic monomer produces an antiglare film having enough abrasion resistant property. Examples of trifunctional acrylic monomer and tetrafunctional acrylic monomer include trifunctional and tetrafunctional materials among polyfunctional acrylate monomer such as acrylic or methacrylic ester of polyhydric alcohol, and polyfunctional urethane acrylate monomer synthesized from diisocyanate, polyhydric alcohol and hydroxyl ester of acrylic acid or methacrylic acid. As for these examples, it is desirable that "trifunctional acrylic monomer and tetrafunctional acrylic monomer" of 80 wt % or more based on a binder matrix forming material is used.

In addition, a binder matrix forming material can include a thermoplastic resin and the like besides an ionizing radiation-curable material.

Examples of the usable thermoplastic resin include cellulose derivatives such as acetylcellulose, nitrocellulose, acetylbutylcellulose, ethylcellulose and methylcellulose, vinyl-based resins such as vinyl acetate and copolymer thereof, vinyl chloride and copolymer thereof and vinylidene chloride and copolymer thereof, acetal resin such as polyvinyl formal and polyvinyl butyral, acrylic resin such as acrylate resin and copolymer thereof and methacrylate resin and copolymer thereof, polystyrene resin, polyamide resin, linear polyester resin and polycarbonate resin.

A particle used for some embodiments of the present invention are selected from organic particles such as acryl particle (refractive index 1.49), acryl styrene particle (refractive index 1.49-1.59), polystyrene particle (refractive index 1.59), polycarbonate particle (refractive index 1.58) and melamine particle (refractive index 1.66), and inorganic particles such as silica particle (refractive index 1.46), talc (refractive index 1.54), various aluminosilicate (refractive index 1.50-1.60), kaolin clay (refractive index 1.53) and MgAl hydrotalcite (refractive index 1.50). Further, in the present invention, difference in refractive index between a binder matrix which a binder matrix forming material is cured and a particle can be equal to or less than 0.07.

When ultraviolet ray-curable material among the ionizing radiation-curable materials is used, a photopolymerization initiator is added to a coating liquid. A known photopolymerization initiator can be usable, but the use of one suitable for a binder matrix forming material to be used is preferred. As the photopolymerization initiator, benzoin such as benzoin, benzoinmethylether, benzoinethylether, benzoinisopropylether and benzylmethylketal and alkyl ethers thereof can be used. The use amount of the photosensitizing agent is 0.5-20 wt %, preferably 1-5 wt % relative to the binder matrix forming material.

A solvent can be added to a coating liquid if necessary. The inclusion of a solvent can permit a particle or a binder matrix to scatter uniformly and can permit viscosity of a coating liquid to be adjusted to a desired range in a case where a coating liquid is applied to a transparent substrate.

In the present invention, in a case where a triacetylcellulose film is used as a transparent substrate, it is desirable that a mixed solvent including both one kind of solvent and another kind of solvent, wherein the one kind of solvent dissolves or swells a triacetylcellulose film and the another kind of solvent does not dissolve or swell a triacetylcellulose film, is used. The use of the mixed solvent permits an antiglare film to have enough adhering strength.

As a solvent which dissolves or swells a triacetylcellulose film, ether such as dibutyl ether, dimethoxymethane, dimethoxyethane, diethoxyethane, propylene oxide, dioxan, dioxolane, trioxane, tetrahydrofuran, anisole and phenetole, or some ketones such as acetone, methyl ethyl ketone, diethyl ketone, dipropyl ketone, di-isobutyl ketone, cyclopentanone, cyclohexanone, methylcyclohexanone and methylcyclohexanone, or ester such as ethyl formate, propyl formate, formic acid n- pentyl, methyl acetate, ethyl acetate, methyl propionate, ethyl propionate, acetic acid n-pentyl and γ-butyrolactone, or cellosolve such as methyl cellosolve, cellosolve, butylcellosolve and cellosolve acetate can be used. As for these materials, one kind of a material can be used alone and two or more kinds of materials which are mixed can be used.

As a solvent which does not dissolve or swell a triacetylcellulose film, aromatic hydrocarbons such as toluene, xylene, cyclohexane and cyclohexylbenzene, or hydrocarbon such as n-hexane, or some ketones such as methyl isobutyl ketone and methyl butyl ketone can be used. As for these materials, one kind of a material can be used alone and two or more kinds of materials which are mixed can be used.

To a coating liquid used for the present invention, other functional additives may be added. But, it is desirable that other functional additives does not affect transparency, light diffuseness etc. Examples of the usable functional additive include an antistatic agent, an ultraviolet absorber, an infrared absorber, a refraction index-adjusting agent, an antifouling agent, a water repellent agent, an adhesiveness-improving agent and a curing agent. An antiglare layer to be formed can have functions such as an antistatic function, an ultraviolet absorbing function, an infrared absorbing function, an antifouling function and a water repellent function besides an antiglare function.

A coated film is formed by applying a coating liquid to a transparent substrate.

A coating method using a roll coater, a reverse roll coater, a gravure coater, a knife coater, a bar coater or a die coater can be used as well as a well known methods in order to apply a coating liquid to a transparent substrate. Among them, a die coater which can apply a coating liquid at high speed by roll to roll method is preferably used. The solid content concentration of the coating liquid differs depending on a coating method. The solid content concentration may be around 30-70 wt % in weight ratio.

Figure 4:
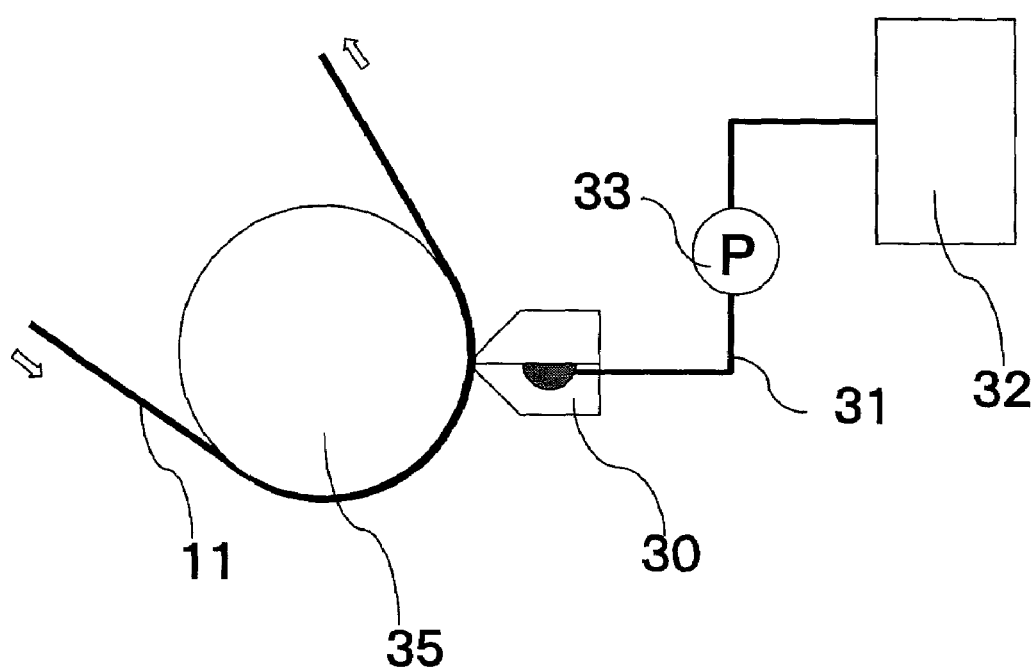
FIG. 4 is a view of a frame format of a die coater application apparatus.

Next, a die coater application apparatus which can be used for the present invention is described below. FIG. 4 shows a view of a frame format of a die coater application apparatus. As for a die coater application apparatus, die head 30 is connected to tank 32 for a coating liquid by piping 31 and a coating liquid in tank 32 is sent to inside of die head 30 by liquid supplying pump 33. A coating liquid sent to die head 30 is discharged from a slit of die head 30 and then a film is formed on transparent substrate 11. A film can be continuously formed on transparent substrate by roll to roll method by using a winding—type transparent substrate 11 and rotary roll 35.

An antiglare layer can be formed by irradiating a film with ionizing radiation, wherein the film can be formed by applying a coating liquid to a transparent substrate. Usable ionizing radiation includes ultraviolet rays, electron beams.

In the case of ultraviolet curing, such light source as a high-pressure mercury lamp, a low-pressure mercury lamp, an ultrahigh-pressure mercury lamp, a metal halide lamp, a carbon arc lamp and a xenon arc lamp can be utilized.

In the case of electron beam curing, electron beams emitted from various types of electron beam accelerators such as of Cockroft-Walton type, Vandegraph type, resonance transformation type, insulated core transformer type, linear type, Dynamitron type and radio-frequency type, can be utilized. The electron beam has an energy of preferably 50-1000 KeV, more preferably 100-300 KeV.

Before and after forming an antiglare layer by the curing process, a drying process may be provided. The curing and drying may be effected simultaneously. Especially, in a case where a coating liquid includes a binder matrix, a particle and a solvent, a drying process before irradiating a formed film with ionizing radiation is necessary in order to remove a solvent included in the formed film.

Examples of drying means include heating, air blowing and hot air blowing.

An antiglare film is formed by the above mentioned process.

In addition, as a binder matrix forming material, a material other than an ionizing radiation-curable material can be used. For example, an antiglare layer can be formed by using a heat-curable material, applying the heat-curable material with a particle to a transparent material and heating the heat-curable material. Further, as a binder matrix forming material, a thermoplastic resin can be used. Further, a binder matrix can be formed by using a metal alkoxide, and hydrolyzing and dehydration-condensing the metal alkoxide.

An antiglare film of the present invention can have enough external light reflection preventive property without the whitening.

EXAMPLE

Comparative Example A1

A triacetylcellulose film (TD-80U, manufactured by Fuji Photo Film Co., LTD.) was used as a transparent substrate. As a coating liquid, a binder matrix forming material and a particle shown in A of Table 1 were used, further, a mixed solvent including dioxolane of 30 part by weight and toluene of 70 part by weight as a solvent, Irgacure 184 (manufactured by Ciba Specialty Chemicals) as photopolymerization initiator of 5 part by weight and BYK-350 (manufactured by BYK-Chemie) as a leveling agent of 0.2 part by weight were used. A coated film was formed on a triacetylcellulose film by using a die coater application apparatus so that average film thickness of a dried and cured antiglare layer was 5 μm. The solvent included in the coated film was removed by drying the coated film, thereafter the antiglare layer was cured through ultraviolet irradiation of 400 mJ/cm$^2$ using a high-pressure mercury lamp under an atmosphere of 0.03% or less of oxygen concentration. Thus, an antiglare film was prepared.

Example A2

An antiglare film was prepared by the almost same way as Comparative Example A1. However, average film thickness of a dried and cured antiglare film was 7 μm.

Example A2

An antiglare film was prepared by the almost same way as Comparative Example A1. However, average film thickness of a dried and cured antiglare film was 19 μm.

Comparative Example A4

An antiglare film was prepared by the almost same way as Comparative Example A1. However, average film thickness of a dried and cured antiglare film was 21 μm.

Example B1

An antiglare film was prepared by the almost same way as Comparative Example A1 using a binder matrix forming material and a particle shown in B of Table 1 and using a solvent, a photopolymerization initiator and a leveling agent same as Comparative Example A1 so that average film thickness of a dried and cured antiglare layer was 6 μm.

Comparative Example B2

An antiglare film was prepared by the almost same way as Example B1. However, average film thickness of a dried and cured antiglare film was 10 μm.

Comparative Example C1

An antiglare film was prepared by the almost same way as Comparative Example A1 using a binder matrix forming material and a particle shown in C of Table 1 and using a solvent, a photopolymerization initiator and a leveling agent same as Comparative Example A1 so that average film thickness of a dried and cured antiglare layer was 4 μm.

Comparative Example C2

An antiglare film was prepared by the almost same way as Comparative Example C1. However, average film thickness of a dried and cured antiglare film was 8 μm.

Comparative Example D1

An antiglare film was prepared by the almost same way as Comparative Example A1 using a binder matrix forming material and a particle shown in D of Table 1 and using a solvent, a photopolymerization initiator and a leveling agent same as Comparative Example A1 so that average film thickness of a dried and cured antiglare layer was 15 μm.

Example D2

An antiglare film was prepared by the almost same way as Comparative Example D1. However, average film thickness of a dried and cured antiglare film was 25 μm.

Comparative Example E1

An antiglare film was prepared by the almost same way as Comparative Example A1 using a binder matrix forming material and a particle shown in E of Table 1 and using a solvent, a photopolymerization initiator and a leveling agent same as Comparative Example A1 so that average film thickness of a dried and cured antiglare layer was 20 μm.

Comparative Example E2

An antiglare film was prepared by the almost same way as Comparative Example E1. However, average film thickness of a dried and cured antiglare film was 30 μm.

Example F1

An antiglare film was prepared by the almost same way as Comparative Example A1 using a binder matrix forming material and a particle shown in F of Table 1 and using a solvent, a photopolymerization initiator and a leveling agent same as Comparative Example A1 so that average film thickness of a dried and cured antiglare layer was 7 μm.

Example F2

An antiglare film was prepared by the almost same way as Example F1. However, average film thickness of a dried and cured antiglare film was 17 μm.

Comparative Example G1

An antiglare film was prepared by the almost same way as Comparative Example A1 using a binder matrix forming material and a particle shown in G of Table 1 and using a solvent, a photopolymerization initiator and a leveling agent same as Comparative Example A1 so that average film thickness of a dried and cured antiglare layer was 8 μm.

Comparative Example G2

An antiglare film was prepared by the almost same way as Comparative Example G1. However, average film thickness of a dried and cured antiglare film was 16 μm.

TABLE 1

| | | Material | Refractive index | Part by weight |
|---|---|---|---|---|
| Coating liquid A | Binder matrix forming material | trimethylolpropane triacrylate pentaerythritol tetraacrylate | 1.53 (nb) | 70 30 |
| | Particle | acryl styrene particle (average particle diameter(r): 5.0 μm) | 1.55 (np) | 20 |
| Coating liquid B | Binder matrix forming material | trimethylolpropane triacrylate pentaerythritol tetraacrylate | 1.53 (nb) | 70 30 |
| | Particle | acryl styrene particle (average particle diameter(r): 3.5 μm) | 1.55 (np) | 25 |
| Coating liquid C | Binder matrix forming material | trimethylolpropane triacrylate pentaerythritol tetraacrylate | 1.53 (nb) | 70 30 |
| | Particle | acryl styrene particle (average particle diameter(r): 2.5 μm) | 1.55 (np) | 35 |
| Coating liquid D | Binder matrix forming material | trimethylolpropane triacrylate pentaerythritol tetraacrylate | 1.53 (nb) | 70 30 |
| | Particle | acryl styrene particle (average particle diameter(r): 7.5 μm) | 1.55 (np) | 10 |
| Coating liquid E | Binder matrix forming material | trimethylolpropane triacrylate pentaerythritol tetraacrylate | 1.53 (nb) | 70 30 |
| | Particle | acryl styrene particle (average particle diameter(r): 9.0 μm) | 1.55 (np) | 5 |
| Coating liquid F | Binder matrix forming material | trimethylolpropane triacrylate pentaerythritol tetraacrylate | 1.53 (nb) | 70 30 |
| | Particle | styrene particle (average particle diameter(r): 5.0 μm) | 1.59 (np) | 20 |
| Coating liquid G | Binder matrix forming material | trimethylolpropane triacrylate pentaerythritol tetraacrylate | 1.53 (nb) | 70 30 |
| | Particle | melamine particle (average particle diameter(r): 5.0 μm) | 1.65 (np) | 20 |

<Evaluation>

Center line average roughness and reflectivity of 5° angle of antiglare films obtained in Examples and Comparative Examples were measured and the whitening, the glaringness of reflected external light and the abrasion resistant property were evaluated.

<Evaluation Method> method of measuring reflectivity of 5° angle

As for an antiglare film, a surface of triacetylcellulose where an antiglare layer was not formed was coated by using a matte-black spray. Subsequently, "reflectivity of 5° angle" of a front surface of an antiglare layer was measured by using a reflectivity measuring apparatus (U-4000 (integrating-sphere type, measuring wavelength 550 nm); a product of Hitachi High-Technologies Corporation).

method of measuring "image clarity ($C_{(0.5)}+C_{(1.0)}+C_{(2.0)}$) measured by reflection method"

"Image clarity measured by reflection method" of antiglare films obtained in Examples and Comparative Examples is measured according to JIS K7105-1981 using an image clarity meter (a product of Suga Test Instruments co., ltd.). At this time, "image clarity ($C_{(0.5)}$) measured by reflection method" using a optical comb having width of 0.5 mm, "image clarity ($C_{(1.0)}$) measured by reflection method" using a optical comb having width of 1.0 mm and "image clarity ($C_{(2.0)}$) measured by reflection method" using a optical comb having width of 2.0 mm were measured respectively. The sum of them is defined as "image clarity ($C_{(0.5)}+C_{(1.0)}+C_{(2.0)}$) measured by reflection method".

method of evaluating whitening level (white blur)

Respective antiglare films obtained in Examples and Comparative Examples were laminated to respective black plastic plates and, in that state, the reflection of external light such as fluorescent light at a part of the films was evaluated visually. The judgment standard is shown below.

○: As for a part other than reflection light, white blur was not observed as a whole.

×: white blur was observed as a whole and it was distinguished.

method of evaluating antiglare property (external light preventive property)

Respective antiglare films obtained in Examples and Comparative Examples were laminated to respective black plastic plates and, in that state, the reflection of fluorescent light at a part of the films was evaluated visually. The judgment standard is shown below.

○: reflected light was not glaring and was not distinguished.
×: reflected light was glaring and was distinguished.

a lateral direction. An adhesive tape (24 mm width, for industrial use: a product of NICHIBAN CO., LTD.) was attached to the squares. Then, the adhesive tape was peeled off and adhesiveness between an antiglare layer and a triacetylcellulose film was evaluated. As a result, in an antiglare film obtained in example A2, A3, B1, D2, F1 or F2, at the time when the adhesive tape was peeled off, there was no squares of which

TABLE 2

|  | Coating liquid | Film thickness (H) (μm) | H/r | nb − np | reflectivity of 5° angle (%) | image clarity measured by reflection method (%) | Whitening (white blur) | Antiglare property |
|---|---|---|---|---|---|---|---|---|
| Comparative Example A1 | Coating liquid A | 6 | 1.2 | 0.02 | 1.4 | 24 | ○ | × |
| Example A2 | Coating liquid A | 7 | 1.4 | 0.02 | 2.5 | 41 | ○ | ○ |
| Example A3 | Coating liquid A | 19 | 3.8 | 0.02 | 3.7 | 69 | ○ | ○ |
| Comparative Example A4 | Coating liquid A | 21 | 4.2 | 0.02 | 4.4 | 76 | × | ○ |
| Example B1 | Coating liquid B | 6 | 1.7 | 0.02 | 2.7 | 56 | ○ | ○ |
| Comparative Example B2 | Coating liquid B | 10 | 2.9 | 0.02 | 3.5 | 80 | × | ○ |
| Comparative Example C1 | Coating liquid C | 4 | 1.6 | 0.02 | 2.2 | 75 | × | × |
| Comparative Example C2 | Coating liquid C | 8 | 3.2 | 0.02 | 3.0 | 89 | × | ○ |
| Comparative Example D1 | Coating liquid D | 15 | 2.0 | 0.02 | 2.2 | 25 | ○ | × |
| Example D2 | Coating liquid D | 25 | 3.3 | 0.02 | 2.9 | 37 | ○ | ○ |
| Comparative Example E1 | Coating liquid E | 20 | 2.2 | 0.02 | 2.0 | 60 | ○ | × |
| Comparative Example E2 | Coating liquid E | 30 | 3.3 | 0.02 | 3.2 | 75 | × | × |
| Example F1 | Coating liquid F | 7 | 1.4 | 0.06 | 2.6 | 44 | ○ | ○ |
| Example F2 | Coating liquid F | 17 | 3.4 | 0.06 | 3.6 | 65 | ○ | ○ |
| Comparative Example G1 | Coating liquid G | 8 | 1.6 | 0.12 | 1.5 | 46 | ○ | × |
| Comparative Example G2 | Coating liquid G | 16 | 3.2 | 0.12 | 2.1 | 64 | ○ | × |

※H/r: (average film thickness of an antiglare layer(H))/(average particle diameter of a particle(r))
※nb − np: (refractive index of a binder matrix(nb)) − (refractive index of a particle (np))

In Examples and Comparative Examples, in a case where reflectivity of 5° angle of a surface in an antiglare layer side of an antiglare film is 2.4-4.4%, image clarity measured by reflection method on an antiglare layer side of an antiglare film is 20-70% and difference in refractive index between a binder matrix and a particle is equal to or less than 0.07, an antiglare film having enough external light reflection preventive property without the whitening could be obtained.

A substrate with a black matrix (BM) of 150 ppi pattern was placed on a light table incorporating fluorescent light tubes and an antiglare film obtained in Example A2, A3, B1, D2, F1 or F2 was placed thereupon. In this state, dazzling of an antiglare layer was evaluated by eyes from a directly above position. In this evaluation, dazzling was not observed. An antiglare film of Example A2, A3, B1, D2, F1 or F2 was without dazzling.

Further, small slits like a grid at 1 mm intervals were made in an antiglare layer of an antiglare film of Example A2, A3, B1, D2, F1 or F2. 100 squares were formed, wherein there ware 10 squares in a longitudinal direction and 10 squares in a lateral direction. An adhesive tape (24 mm width, for industrial use: a product of NICHIBAN CO., LTD.) was attached to the squares. Then, the adhesive tape was peeled off and adhesiveness between an antiglare layer and a triacetylcellulose film was evaluated. As a result, in an antiglare film obtained in example A2, A3, B1, D2, F1 or F2, at the time when the adhesive tape was peeled off, there was no squares of which antiglare layer was peeled from a triacetylcellulose film. An antiglare film of Example A2, A3, B1, D2, F1 or F2 was an antiglare film having enough adhesiveness between an antiglare layer and a triacetylcellulose film.

Surface of an antiglare layer of an antiglare film obtained in Example A2, A3, B1, D2, F1 or F2 was rubbed ten times by reciprocal movement of a steel wool (#0000), where load of 250 g/cm$^2$ was applied to the steel wool. In checking a scratch in surface of an antiglare layer by eyes, no scratch was observed. That is, an antiglare film obtained in Example A2, A3, B1, D2, F1 or F2 had enough abrasion resistant property.

What is claimed is:

1. An antiglare film comprising:
   a transparent substrate; and
   an antiglare layer including a binder matrix and a particle, on the transparent substrate,
   wherein reflectivity of 5° angle of a surface of the antiglare film which surface is in the antiglare layer side among both sides of the antiglare film is 2.4-4.4%, wherein image clarity ($C_{(0.5)}+C_{(1.0)}+C_{(2.0)}$) measured by reflection method on an antiglare layer side is 20-70%, and wherein difference in refractive index between the binder matrix and the particle is equal to or less than 0.07.

2. The antiglare film according to claim 1, wherein average film thickness of the antiglare layer is 1.4 times or more than average particle diameter of the particle included in the antiglare layer and is 3.8 times or less than the average particle diameter.

3. The antiglare film according to claim 1, wherein the average film thickness of the antiglare layer is 3-30 μm.

4. The antiglare film according to claim 1, wherein difference in refractive index between the binder matrix and the particle is equal to or more than 0.02.

5. The antiglare film according to claim 1, wherein the transparent substrate is a triacetylcellulose film.

6. The antiglare film according to claim 1, wherein a binder matrix forming material includes trifunctional acrylic monomer and tetrafunctional acrylic monomer of 80 part by weight or more based on a binder matrix forming material of 100 part by weight.

7. The antiglare film according to claim 1, wherein the transparent substrate is a part of a polarizing plate.

8. A liquid crystal display comprising:

the antiglare film according to claim 1;

one pair of polarizing plates sandwiching a liquid crystal cell, under the antiglare film; and a backlight unit under the one pair of polarizing plates.

* * * * *